May 21, 1940.  S. A. RICHARDSON  2,201,301
CENTRIFUGAL SEPARATING DEVICE
Filed March 28, 1938
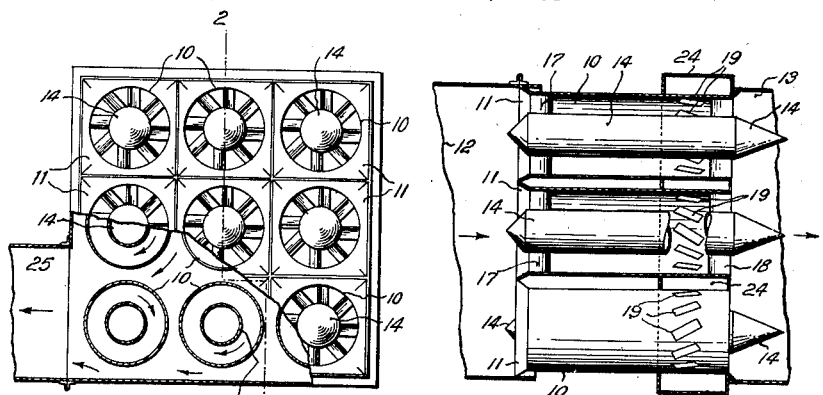
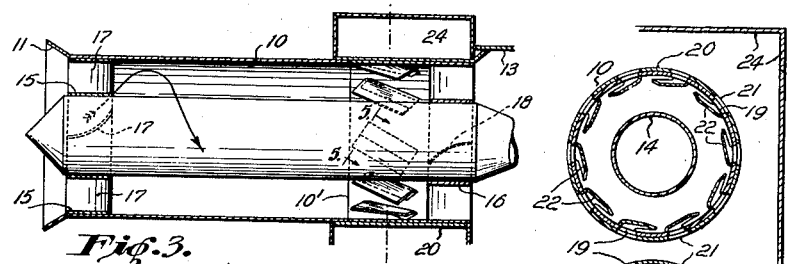
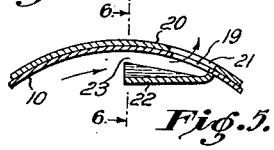
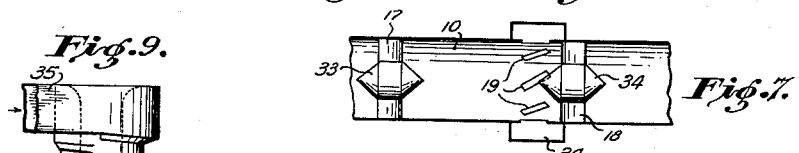
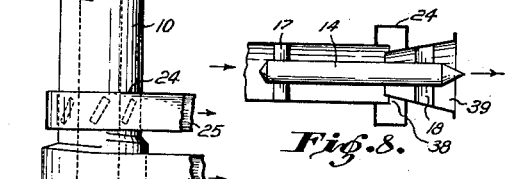
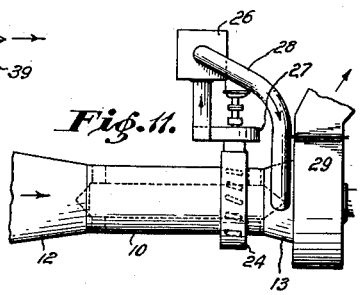
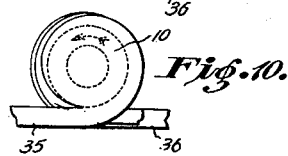
INVENTOR
Sidney Alan Richardson
BY
ATTORNEYS Patented May 21, 1940

2,201,301

UNITED STATES PATENT OFFICE 2,201,301

CENTRIFUGAL SEPARATING DEVICE

Sidney Alan Richardson, Footscray, Victoria, Australia, assignor to Western Precipitation Corporation, Los Angeles, Calif., a corporation of California Application March 28, 1938, Serial No. 198,497
In Australia March 30, 1937

1 Claim. (Cl. 183—80)

This invention relates to improvements in and connected with devices for effecting the separation of suspended material from gases or vapors by cyclonic or vortical action.

Separating devices of the abovementioned type usually comprise a vertically disposed cylindrical chamber having a converging or cone shaped lower end for the discharge of the separated solids.

A feed or inlet passage connects with the upper cylindrical portion of the chamber and a clean gas discharge pipe disposed coaxially at the upper end of the chamber communicates with the upper end of an open-ended cylindrical baffle disposed concentrically within the upper end of the chamber whereby an annular space is formed between it and the wall of the chamber.

In use air or gas is delivered to the inlet end of the chamber with a vortical movement. Such air or gas moves downwards within the chamber as an outer vortex and then returns upwards towards the outlet as an inner vortex. It will be clear that the downward component of the outer vortex assists gravity in directing the solid particles towards the outlet at the lower end of the chamber.

It is found in practice that a relatively high pressure is required to force the air through the chamber, thus rendering such devices relatively expensive to operate and preventing their use in certain circumstances, as, e. g., when insufficient pressure is available. In some cases also these known separating devices are too large to be accommodated in the available space whilst furthermore their initial cost is considerable. In addition, when space is restricted, it is sometimes difficult to arrange the pipe-work conveniently owing to the necessity of connecting the gas inlet and gas discharge pipes to the same end of the separating chamber.

Now, the object of the present invention is to provide improvements in and connected with centrifugal separators whereby, inter alia, the abovementioned disadvantages will be obviated or minimised.

The invention includes the method of separating suspended particles from air, gas or vapor, comprising passing said air, gas or vapor in one direction through a confined space and with a rotational or vortical movement whereby said particles are thrown outwardly, and separating an outer peripheral portion of the whirling mass from the main body thereof during its passage through said confined space.

Apparatus in accordance with the invention broadly comprises a chamber having means for delivering gas or vapor to one end thereof with a rotational or vortical movement, a discharge opening for clean gas or vapor at the opposite end of the separating chamber, and at least one discharge opening at the periphery of the chamber, said discharge opening or openings serving for the discharge from the chamber of a portion of the air, gas or vapor, together with a substantial proportion of the suspended particles. Preferably the length of the separating chamber materially exceeds the diameter thereof.

An axial core of substantial diameter is preferably located within the chamber whereby the space for the passage of air, gas or vapor is substantially of annular shape in cross section.

Thus, by means of this invention, the clean air, gas or vapor is discharged from that end of the separating chamber which is opposite to the inlet end thereof with the result that the formation of an inner oppositely moving vortex is obviated.

Furthermore the discharge outlet may correspond in area with the area of the chamber so that the resistance to the discharge of the cleaned gas or air is minimised. Thus the separating chamber may advantageously consist of an elongated cylinder which is open at both ends, one of such ends constituting the inlet and the opposite end the discharge outlet for the air or gas.

A salient feature of the invention resides in providing a circumferential series of discharge openings in the periphery of the separating chamber, said openings being preferably in the form of elongated slots disposed obliquely whereby their longitudinal edges will be disposed approximately at right angles to the path of movement of the separated particles, said path of movement being approximately helical.

A further important feature of the invention resides in providing inwardly directed deflector plates at an inclination to the inner peripheral surface of the chamber, said deflector plates being arranged to substantially overlie the aforesaid discharge openings and provide relatively narrow openings between their outer ends and the adjacent inner surface of the chamber.

Another important feature of the invention resides in arranging a collecting chamber about that portion of the separating chamber which is provided with the said discharge openings for suspended particles, said collecting chamber being preferably connected to a source of reduced pressure.

A still further important feature of the invention resides in providing means adjacent the discharge end of the separating chamber to convert the vortical movement of the air, gas or vapor into substantially uniform movement of translation.

The separating chamber may be arranged vertically or horizontally or at any desired inclination and if desired a plurality of separating chambers may be arranged to operate in parallel.

In the drawing, which illustrates several embodiments of the invention—

Figure 1 is a view in elevation (partly in section) of a multiple separating device in accordance with the invention;

Figure 2 is a view in sectional side elevation taken on the line 2—2 of Figure 1;

Figure 3 is a view in sectional side elevation of one of the separating chambers shown in Figures 1 and 2 and is drawn to a larger scale;

Figure 4 is a view in sectional end elevation taken on the line 4—4 of Figure 3;

Figure 5 is a sectional view taken on the line 5—5 of Figure 3 and is drawn to a larger scale;

Figure 6 is a sectional view taken on the line 6—6 of Figure 5;

Figures 7 and 8 are sectional views similar to Figure 3 and show modifications;

Figure 9 is a view in elevation of a further modification of the invention;

Figure 10 is a view in plan of the apparatus shown in Figure 9; and

Figure 11 is a diagrammatic view in plan showing one practical application of the invention.

Referring now to Figures 1 to 6 of the drawing, the reference 10 is employed to designate each of a plurality of separating chambers of circular shape in cross section and of a length which materially exceeds the diameter; said chambers being arranged side by side to operate in parallel.

The inlet end of each separating chamber is flared outwardly at 11 to form a mouth of square shape the edges of which are disposed in contact with the adjacent edges of the adjacent chambers.

A common supply passage 12 communicates with the inlet ends of the separating chambers while a common discharge passage 13 communicates with the opposite ends of the chambers.

A cylindrical core member 14 is arranged concentrically within each separating chamber 10 whereby the effective portion of the latter is annular in form and the ends of these core members are shaped to minimise resistance to the flow of gas or vapor through the separating chambers.

Each core member 14 is retained in position by means of a pair of annular members 15 and 16 respectively which incorporate radially disposed guide vanes 17 and 18 said annular members being respectively arranged adjacent to the inlet and discharge ends of the corresponding separating chamber.

The guide vanes 17 (see Figure 3) are so shaped as to impart angular movement to the gas or vapor entering the respective chamber while the guide vanes 18 disposed adjacent to the discharge end of the chamber are so shaped as to substantially eliminate such angular movement whereby the gas or vapor is discharged into the passages 13 with a substantially uniform movement of translation.

Thus the air or gas has a vortical motion only while passing through the separating chambers between the guide vanes 17 and 18.

A circumferential series of slots 19 is formed in the wall of each separating chamber adjacent to the guide vanes 18 such slots being rectangular in shape and being disposed obliquely with respect to the axis of the chamber whereby the longitudinal edges of the slots are disposed approximately at right angles to the path of movement of particles in contact with the inner periphery of the chamber.

Preferably the slots 19 are provided in a separately formed section 10' of the chamber (see Figure 3) whereby said section may be readily removed for replacement or otherwise. For this purpose the discharge end of the main portion of each separating chamber projects into the adjacent end of a coaxially arranged outer cylinder 20 which is secured thereto as by welding and this outer cylinder serves to support the chamber section 10' and also the annular member 16 incorporating the vanes 18, it being understood that the inner periphery of the section 10' of the chamber is substantially flush with the inner periphery of the main portion thereof.

The outer cylinder 20 is formed with a plurality of oblique slots 21 which register with and preferably are somewhat greater in size han the slots 19.

The inner periphery of the section 10' of each separating chamber is fitted with a plurality of rigid deflector plates 22 which correspond in number to the slots 19. Each of these deflector plates is secured to the section 10' adjacent the rear longitudinal edge of one of the slots 19 and extends forwardly above the slot to a position which is substantially in advance of the front edge thereof (see Figures 3 to 6). It is to be noted that for convenience in illustration these deflector plates have been omitted from Figures 1 and 2 of the drawing.

It will be clear, particularly from Figures 5 and 6 of the drawing, that the forwardly projecting portion of each deflector plate 22 is disposed out of contact with the inner periphery of the section 10' of the separating chamber whereby an inlet opening 23 is formed therebetween at the free end of said deflector plate. The radial width of this opening 23 preferably decreases from a maximum at that end thereof which is adjacent to the inlet end of the separating chamber to a minimum at the opposite end thereof (see Figure 6) as it is found in practice that the major portion of the separated material passes through those portions of the slots 19 which are remote from the discharge end of the separating chamber. If desired, the deflector plates 22 may be streamlined in order to minimise disturbance of the flow of gas or vapor.

A common collecting chamber 24 surrounds the slotted portions of the separating chambers and this collecting chamber is fitted with an outlet duct 25 which preferably is connected to a suitable source of reduced pressure.

In operation, gas or vapor containing suspended particles is delivered to the common inlet passage 12 from which it passes through the flared mouthpieces 11 into the adjacent ends of the annular separating chambers 10. In passing between the guide vanes 17 an angular movement is imparted to the gas or vapor whereby it proceeds through the separating chambers with a vortical movement—that is to say, it has a tangential, as well as an axial, component of motion.

As a result, the heavier suspended particles are thrown outwardly by centrifugal action into substantial contact with the inner peripheries of the separating chambers 10 and such particles move along the chamber in an approximately helical path until they pass below the leading edge of one or other of the deflector plates 19. The particles, together with a proportion of the gas or vapor, then pass outwardly through the slots 19 into the collecting chamber 24 by the combined action of centrifugal force and the deflector plates. Thus the deflector plates serve to skim off the outer layer of the swirling mass in which the major portion of the solid or other relatively heavy particles are contained.

The remaining portion of the body of gas or vapor which is substantially free of suspended particles, then passes between the straightening vanes 18 (which substantially eliminate the tangential component of movement) and into the discharge passage 13. The core 14 promotes the formation of a stable and non-turbulent vortical current and so conduces to efficient separation, though it is to be understood that the provision of such a core is not essential.

The material which enters the common collecting chamber with a rotary motion finally passes outwardly through the outlet duct 25 which is so positioned that the mouth thereof is substantially normal to the path of movement of the gas or vapor adjacent thereto.

It is preferred to use the apparatus as a concentrating device whereby the solid particles within the common collecting chamber are still suspended in the gaseous medium. When the apparatus is employed in this way and it is desired to collect the solid particles, it is necessary to employ a further separating device of any suitable type to which the concentrated mixture is directed by the duct 25.

Such an arrangement is shown diagrammatically in Figure 11 of the drawing in which the duct 25 communicates with the intake of a small fan 27 which maintains a reduced pressure in the collecting chamber 24 and which delivers the concentrated mixture to a multiple vortical separator 26 which may be of the kind disclosed in United States patent specification No. 1,886,548. The clean gas or vapor discharged from the separator 26 is returned through passage 28 to the main body of gas or vapor in the duct 13.

The separated particles are collected in a common receptacle (not shown) forming part of the separator 26 and a main fan 29 is provided to cause the gas or vapor to pass continuously into and through the main separating chamber 10. It will be evident, however, that various arrangements of one or more fans may be used in lieu of the arrangement shown in Figure 11. Good results have been achieved in practice when 5% to 10% of the gas or vapor has been skimmed off into the collecting chamber 24 but the proportion is variable according to operating conditions and the nature of the solid particles.

If desired, the final separating device may be of substantially the same form as the primary separating chamber shown in Figures 3 and 4.

Whilst, as previously stated, it is preferred to employ an auxiliary separating device when it is desired to collect the separated particles, it is not always essential to do so, particularly when the suspended particles are relatively heavy.

For example, the collecting chamber 24 may be of such size that the velocity therein is reduced to such an extent as to cause the solid particles to settle, in which case the lower end of the collecting chamber may converge downwardly to a suitable valve controlled discharge opening. When this construction is adopted, a passage is connected to an upper portion of the collecting chamber for the purpose of drawing off the clean gas or vapor whereby a sufficiently reduced pressure is maintained in the collecting chamber.

It is also to be noted that the size, shape and disposition of the deflector plates 22 may be varied to suit different operating conditions and that some measure of separation may be effected even if these elements are entirely omitted.

In the modification shown in Figure 7, the core member 14 previously referred to is omitted whereby the operative portion of the separating chamber 10 is of circular shape in cross-section. In this construction the annular vane carrying members 15 and 16 are fitted with individual core elements 33 and 34 the closed ends of which are of conical shape. In this figure also the deflector plates 22 have been omitted for convenience in illustration.

The construction shown in Figure 8 is similar to that in Figure 3 except that the series of slots 19 in the separating chamber is replaced by an annular opening 38 through which the concentrated mixture passes into the separating chamber 24. For this purpose the discharge end of the separating chamber is formed by a discharge throat 39 which is disposed coaxially with and in proximity to the adjacent end of the body portion 10 of the chamber the inner end of the discharge throat being of smaller diameter than said body portion 10.

Figures 9 and 10 show a further modification in which the inlet and outlet guide vanes have been substituted by volute passages 35 and 36 which respectively communicate with the inlet and outlet passages 12 and 13. Likewise the collecting chamber 24 may be of volute form in cross-section. The ends of the core 14 are preferably flared outwardly as shown in order to obviate abrupt changes in the velocity of the gas or vapor though said core may be omitted if desired. It will be evident that, if desired, a volute passage may be provided at one end only of the separating chamber 10 while guide vanes as shown in Figure 3 may be employed at the opposite end thereof. In cases where the clean gas or vapor may be discharged without substantial disadvantage, as a vortically moving body, the discharge end of the separating chamber need not be provided either with straightening vanes as 18 (Figure 3) or with a volute passage as 36 (Figures 9 and 10).

I claim:

A centrifugal separating device comprising a cylindrical chamber, inlet means adjacent one end of the chamber for the introduction of gas or vapor with a vortical motion, the opposite end of said chamber being provided with a discharge outlet for clean gas or vapor, and an intermediate portion of the periphery of the chamber being formed with a circumferential series of elongated slots the longer edges of said slots being disposed obliquely to the axis of the cylindrical chamber and substantially at right angles to the path of movement of gas- or vapor-borne particles disposed in contact with the inner periphery of the cylindrical chamber, and a deflector plate secured to the periphery of the separating chamber adjacent to the rear longitudinal edge of each of said elongated slots, said deflector plate having a portion extending forwardly above the respective slot and out of contact with the wall of the cylindrical chamber, the opening formed between the free end of each deflector plate and the inner periphery of the cylindrical chamber being wider at that end thereof which is remote from the discharge end of said cylindrical chamber than at the end adjacent thereto.

SIDNEY ALAN RICHARDSON.